Dec. 8, 1964  J. V. J. CORNEY  3,160,763
PULSE DELAY NETWORK INCORPORATING A PULSE GENERATOR
Filed April 24, 1961  2 Sheets-Sheet 1
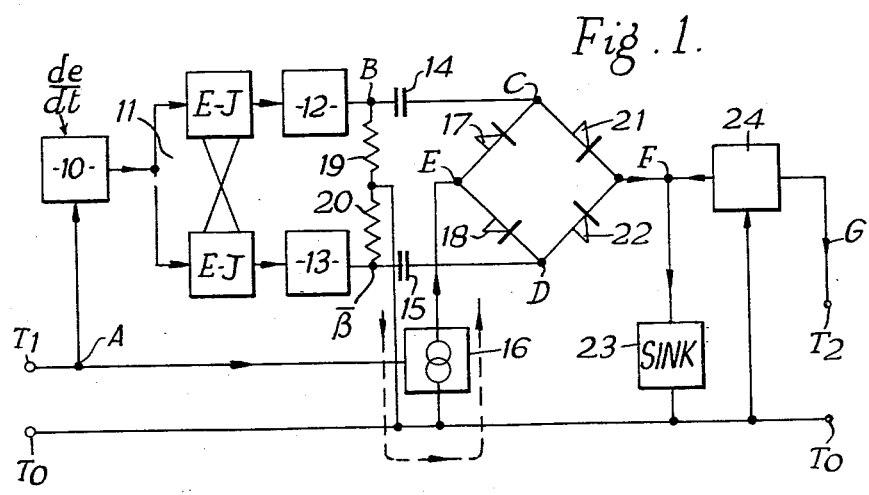
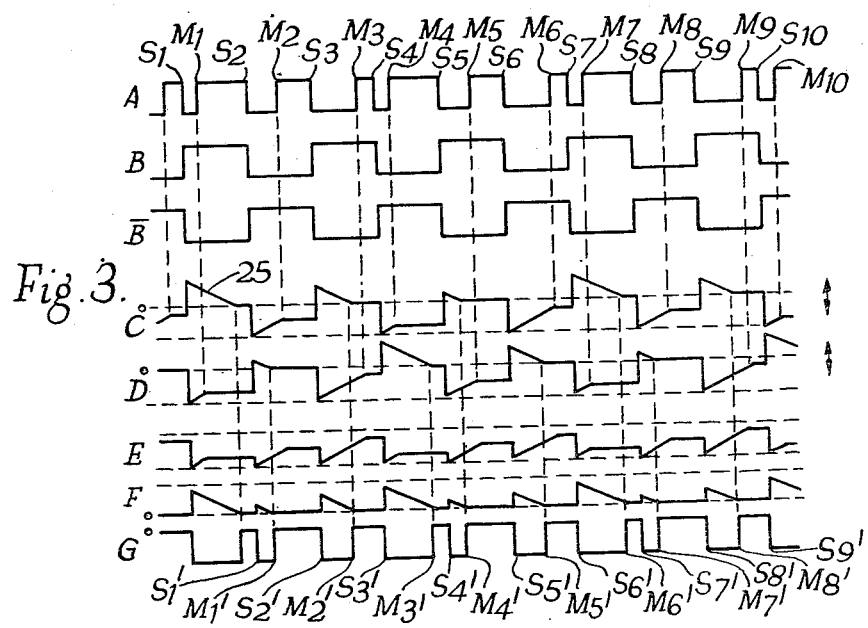
INVENTOR
BY
ATTORNEY

United States Patent Office 3,160,763
Patented Dec. 8, 1964

3,160,763
PULSE DELAY NETWORK INCORPORATING
A PULSE GENERATOR
John Victor James Corney, London, England, assignor to Ferguson Radio Corporation Limited, London, England, a British company
Filed Apr. 24, 1961, Ser. No. 105,224
4 Claims. (Cl. 307—88.5)

The present invention relates to delaying devices for electric pulses and is concerned to provide a pulse-delaying device whereby from a succession of received pulses whose durations and recurrence frequency may vary there can be generated a corresponding succession of pulses in which the leading edge of each generated pulse is delayed and coincides with the leading edge of the next succeeding received pulse and in which the duration of each generated pulse is related to the duration of its corresponding received pulse.

According to the present invention such a pulse-delaying device comprises charging means for applying successive received pulses to cause alternate capacitors of a pair to be charged to levels determined by the durations of the pulses, discharge means for applying each received pulse to discharge, at a predetermined rate, the capacitor charged in response to the next preceding received pulse, and output means responsive to discharge of either capacitor for generating an output pulse which exists as long as the discharge. Thus the rate at which the capacitors are discharged determines the durations of the generated pulses and by suitable choice of the discharge rate the durations of the generated pulses can be made substantially equal to or substantially proportional to the durations of the received pulses. As the leading edge of each generated pulse is coincident with and is determined by the leading edge of the next succeeding received pulse variations in the pulse recurrence frequency are automatically reproduced. Thus variations in both pulse width and pulse repetition frequency are reproduced in the succession of generated pulses.

The invention will now be described, by way of example, with reference to the drawings accompanying this specification in which:

FIG. 1 is a block schematic diagram of a pulse-delaying device,

FIG. 3 is an explanatory waveform diagram.

Figure 2:
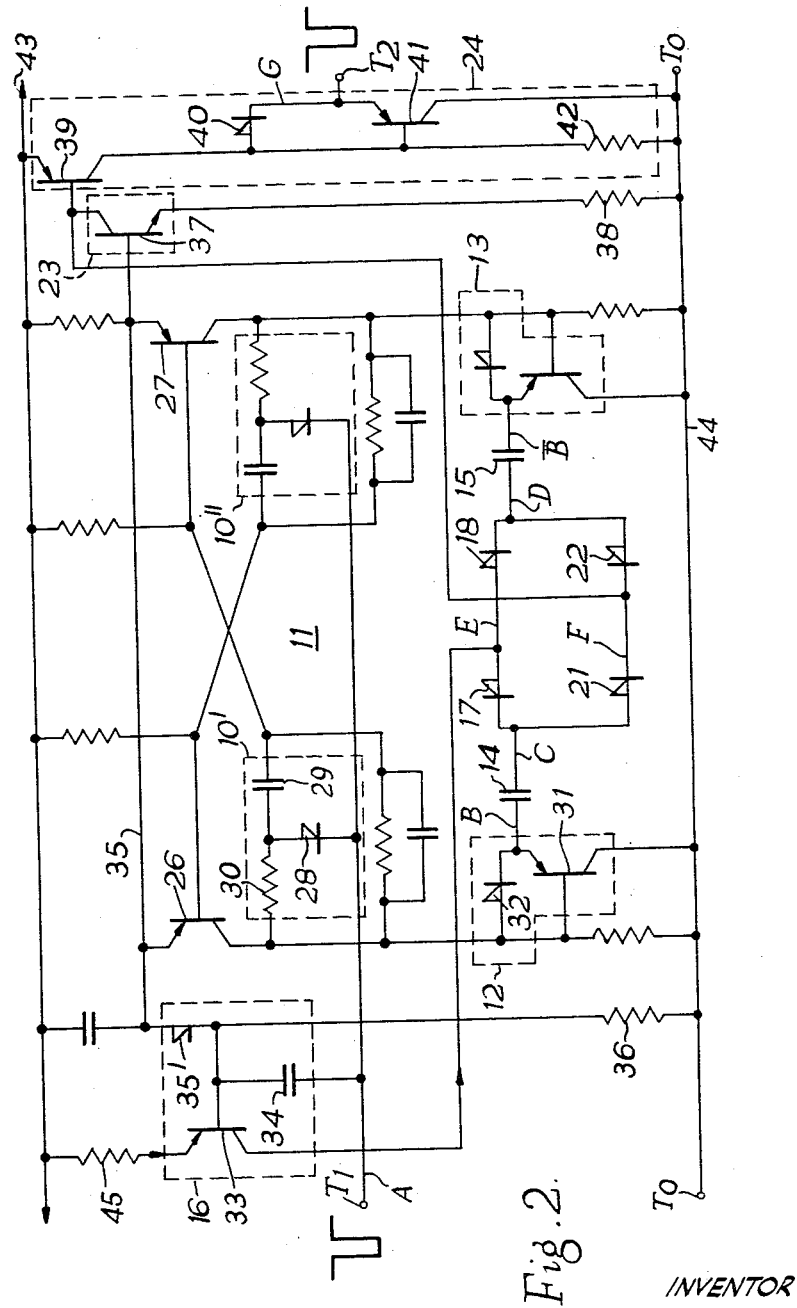
FIG. 2 is a circuit diagram of a pulse-delaying device.

In FIG. 1, a pulse-delaying device comprises two input terminals $T_1$ and $T_0$ and two output terminals $T_2$ and $T_0$, the terminal $T_0$ being common to the input and the output. The circuit between the input and output terminals is for the purpose of generating between the output terminals $T_2$ and $T_0$, in response to a succession of pulses received between the input terminals $T_1$ and $T_0$, a corresponding succession of pulses in which the leading edge of each generated pulse is delayed and coincides with the leading edge of the next succeeding received pulse and in which the duration on each generated pulse is related to the duration of its corresponding received pulse. The device is adapted to maintain these relationships between the received and generated pulses irrespective of modulation in the durations of the received pulses (width modulation) and of frequency or phase-modulation in the received pulses.

The device comprises a differentiating circuit 10 adapted to generate voltage "spikes" from the leading and trailing edges of the received pulses and this is connected to an Eccles-Jordan circuit 11 to which the voltage spikes are applied as trigger pulses. Two outputs of opposite polarities are applied from the Eccles-Jordan circuit through two transistor, emitter-follower circuits 12 and 13 to two capacitors 14 and 15 respectively.

The terminals $T_1$ and $T_0$ are also connected to a gated, constant current source 16, that is a source which provides a constant current output on the application of a gating pulse and zero current in the absence of a gating pulse. The output of the constant current source 16 is connected through two rectifiers 17 and 18 to the two capacitors 14 and 15 respectively. Two resistors 19 and 20 are connected between the terminal $T_0$ and the left-hand plates (in the drawing) of the two capacitors 14 and 15 respectively. Thus charging circuits are provided for the capacitors from the constant current source 16. The right-hand plates of the capacitors 14 and 15 are further connected through two rectifiers 21 and 22 respectively to a terminal F which is connected through a constant current sink 23 to the terminal $T_0$. Thus discharge paths are provided into the sink 23 from the two capacitors. A potential-catching and amplifier circuit 24 is connected between the terminal F and the terminal $T_2$.

The manner in which the device of FIG. 1 functions will be described with the aid of FIG. 3. The waveform shown in FIGS. 3A, B, $\overline{B}$, C, D, E, F and G are those occurring at the points marked A to G (including $\overline{B}$) in FIG. 1.

Thus a received succession of pulses is assumed to have the waveform shown in FIG. 3A in which the effective pulses are negative-going. It will be seen from FIG. 3A that the leading edges $S_1$ to $S_{10}$ of the negative-going pulses shown are regularly recurring but the duration of the pulses varies as shown by the irregular spacing of the trailing edges $M_1$ to $M_{10}$ of the pulses.

The voltage spikes derived from the leading edges of the received pulses by the differentiating circuit 10 are used to trigger the Eccles-Jordan circuit 11 whereby the outputs from the Eccles-Jordan circuit are of half the frequency of the received pulses and are regular in pulse width. These outputs, as appearing at B and $\overline{B}$ in the circuit of FIG. 1, are as shown by the waveform of FIGS. 3B and 3$\overline{B}$.

Just prior to the leading edge $S_1$ the potentials of the points D and F of FIG. 1 are, as shown in FIGS. 3D and 3F assumed to be of the same potential as the terminal $T_0$ having been caught at that potential by the catching device 24; the point C is assumed to be somewhat negative as shown in FIG. 3C; and current is flowing from the catching device 24 into the sink 23. At the leading edge $S_1$ the point B is made suddenly positive and the point $\overline{B}$ suddenly negative as will be seen from FIGS. 3B and $\overline{B}$. These potentials are transmitted by the capacitors 14 and 15 to vary the potentials of the two points C and D accordingly. Thus at the instant $S_1$ the points C and D assume the potentials shown at the instant $S_1$ in FIGS. 3C and D.

The positive potential at the point C biases the rectifier 21 forwardly and hence the capacitor 14 discharges into the constant current sink 23, this discharge being indicated by the sloping region 25 in the waveform of FIG. 3C. The rectifier 17 is reverse-biased by the potential at C and hence is non-conducting The negative potential at the point D biases the rectifier 18 forwardly and, as the constant-current generator 16 delivers current during the pulse beginning at $S_1$ current flows from the constant-current generator through the rectifier 18 to charge the capacitor 15 to a level determined by the magnitude of the constant current and the duration of the pulse beginning at $S_1$. Thus the charge in the capacitor 15 is representative of the width of the pulse beginning at $S_1$ and ending at $M_1$.

The Eccles-Jordan circuit 11 is next triggered at the leading edge $S_2$ (FIG. 3A) of the succeeding received pulses whereby the polarities of the voltages applied from the emitter-followers 12 and 13 to the capacitors 14 and 15 are reversed as will be seen from FIGS. 3B and 3$\overline{B}$.

Thus the point C in FIG. 1 becomes negative rendering the rectifier 17 conducting and the rectifier 21 non-conducting. The point D becomes positive rendering the rectifier 22 conducting and the rectifier 18 non-conducting.

A discharge path is, therefore, completed from the capacitor 15 to the constant-current sink 23 and this capacitor discharges at a rate determined by the constant current sink. As long as this discharge is taking place an output is provided by the potential-catching and amplifier circuit 24 to the output terminal $T_2$. The duration of this output pulse is determined by the charge in the capacitor 15 and the discharge rate. By arranging the discharge rate to be equal to the charging rate the width of the output pulse is the same as that of the received pulse which gave rise to the charge in the capacitor 15.

The output pulse would then be as shown in FIG. 3G in which the output pulse beginning at the instant $S_1^1$ and ending at $M_1^1$ corresponds in width to the pulse $S_1$—$M_1$ of FIG. 3A. Furthermore the instant $S_1^1$ of FIG. 3G corresponds to the instant $S_2$ of FIG. 3A whereby the leading edge of the output pulse $S_1^1$—$M_1^1$ coincides with the leading edge of the next-received pulse $S_2$—$M_2$.

The pulse $S_2$—$M_2$ is also applied to gate the constant current generator 16 which charges the capacitor 14 through the rectifier 17 to a level determined by the width of the pulse $S_2$—$M_2$.

The changes in potential at the points E and F are as shown in FIGS. 3E and 3F.

This sequence of operations is repeated for the whole of the succession of pulses, alternative capacitors of the pair 14 and 15 being charged in response to successive received pulses and each being discharged in response to the next received pulse. Thus a succession of output pulses is provided as shown in FIG. 3G in which the leading edge of each output pulse coincides with the leading edge of the next received pulse.

FIG. 2 is a circuit diagram, showing an example of the arrangement of FIG. 1 in more detail. In FIGS. 1 and 2 like parts have the same reference. In FIG. 2 the differentiating circuit is divided into two parts 10′ and 10″ connected to the two transistors 26 and 27 of the Eccles-Jordan circuit 11. Each part 10′ and 10″ of the differentiating circuit contains a rectifier, a capacitor and a resistor as shown at 28, 29 and 30 respectively in the part 10′.

The Eccles-Jordan circuit 11 embodying the two transistors 26 and 27 is of conventional construction and need not be described.

The emitter-follower circuit 12 is connected to the collector circuit of the transistor 26 and the emitter-follower circuit 13 is connected to the collector electrode of the transistor 27 as shown.

Each of the emitter-follower circuits comprises a transistor and an auxiliary rectifier as shown at 31 and 32 respectively in the emitter-follower circuit 12.

The gated constant-current generator 16 comprises a transistor 33 driven at its base through a capacitor 34 connected to the input terminal $T_1$.

A bias voltage supply lead 35 is connected through a rectifier 35′ to the base of the transistor 33 and the rectifier 35′ in conjunction with the resistor 36 acts as a D.C. restorer.

During the positive-going excursions of the received pulses the transistor 33 is cut-off and during the negative-going excursions the base potential is caught at the potential of the conductor 35. Thus during the negative-going excursions the emitter current, and hence the collector current, of the transistor is determined by the potential between the conductors 43 and 35 and the emitter resistor 45 of the transistor 33. It will be understood that this action is dependent upon successive pulses being of substantially equal amplitude which exceeds the potential difference between the conductors 35 and 43.

The current pulses flow into either the capacitor 14 or the capacitor 15 as previously described.

The constant-current sink 23 comprises a transistor 37 whose base is connected to the lead 35 whereby the current through the transistor 37 is determined otherwise entirely by a resistor 38 in the emitter electrode of the transistor 37.

The potential-catching device and amplifier 24 comprises a transistor 39, a rectifier 40, a further transistor 41 and a resistor 42.

The transistor 39 is bottomed by input current drawn by the sink 23 unless the point F is driven positive to the supply lead 43 by the capacitor 14 or 15 due to switching by the Eccles-Jordan circuit 11.

When this occurs base current from the transistor 39 is cut off and the collector potential of the transistor 39 falls substantially to that of the supply lead 44. This causes the emitter-follower 41 output potential to fall correspondingly to the same potential. This potential is held until the discharge from the capacitor 14 or 15 is completed through the sink when the transistor 39 bottoms again and the diode reproduces this state at the emitter of the transistor 41.

1. A device for deriving from a first pulse train containing a plurality of pulses of variable duration and identical polarity, a second pulse train containing a like plurality of pulses of identical polarity, each second train pulse having the same duration as the corresponding first train pulse, the second train pulses being delayed with respect to the first train pulses whereby the leading edge of the first, second . . . (N–1)th pulse in the second train is in time coincidence with the leading edge of the second, third . . . Nth pulse in the first train where N identifies the last pulse in the first train, said device comprising
   (a) first and second capacitors;
   (b) first and second capacitor charging means, each charging means being coupled to the corresponding capacitor;
   (c) first and second capacitor discharging means, each discharging means being coupled to the corresponding capacitor;
   (d) first control means responsive to said first pulse train to actuate said first charging means in the presence of each odd numbered first train pulse and to actuate said second charging means in the presence of each even numbered first train pulse, said first control means deactuating each of the charging means in the absence of the appropriate first train pulse;
   (e) second control means responsive to said first pulse train to actuate said first discharging means during the presence of each even numbered first train pulse and to actuate said second discharging means during the presence of each odd numbered first train pulse, said second control means deactuating each of the discharging means in the absence of the appropriate first train pulse; and
   (f) output means coupled to said first and second discharge means to extract said second pulse train therefrom.

2. A device as set forth in claim 1 wherein said first control means includes a constant current generator.

3. A device as set forth in claim 2 wherein said output means includes a pair of output terminals and switching means to alternatively couple each of said first and second discharging means in turn to said output terminals.

4. A device for deriving from a first pulse train containing a plurality of pulses of variable duration and identical polarity, a second pulse train containing a like plurality of pulses of identical polarity, each second train pulse having the same duration as the corresponding first train pulse, the second train pulses being delayed with respect to the first train pulses whereby the leading edge of the first, second . . . (N–1)th pulse in the second train is in time coincidence with the leading edge of the second, third . . . Nth pulse in the first train where N identifies the last pulse in the first train, said device comprising (a) first and second capacitors;
(b) first and second capacitor charging means, each charging means being coupled to the corresponding capacitor;
(c) first and second capacitor discharging means, each discharging means being coupled to the corresponding capacitor;
(d) first control means responsive to said first pulse train to actuate said first charging means in the presence of each odd numbered first train pulse and to actuate said second charging means in the presence of each even numbered first train pulse, said first control means deactuating each charging means in the absence of the appropriate first train pulse, said first control means including a pulse differentiation network responsive to the leading edges but not to the trailing edges of said first train pulse;
(e) second control means responsive to said first pulse train to actuate said first discharging means during the presence of each even numbered first train pulse and to actuate said second discharging means during the presence of each odd numbered first train pulse, said second control means deactuating each of said first and second discharging means in the absence of the appropriate first train pulse; and
(f) output means coupled to said first and second discharge means to extract said second pulse train therefrom.

References Cited in the file of this patent
UNITED STATES PATENTS
2,708,718    Weiss _____ May 17, 1955